United States Patent [19]
Davis et al.

[11] Patent Number: 6,007,159
[45] Date of Patent: Dec. 28, 1999

[54] PARKING BRAKE LOCK-IN KEY SWITCH SYSTEM FOR VEHICLE AIR BRAKE SYSTEM

[75] Inventors: Richard B. Davis; Robert L. Douglas; Brad A. Hively; Terry E. Hively; Michael J. Lehman; Roy S. Zeitlow, all of Fort Wayne, Ind.

[73] Assignee: Navistar International Transportation Corp, Chicago, Ill.

[21] Appl. No.: 09/063,146

[22] Filed: Apr. 20, 1998

[51] Int. Cl.[6] .............................. B60R 25/08; B60J 17/16
[52] U.S. Cl. ................................................................ 303/89
[58] Field of Search ................................... 188/165, 353; 180/272, 287; 303/89; 307/10.1, 10.3, 10.6

[56] References Cited

U.S. PATENT DOCUMENTS

| | | |
|---|---|---|
| 3,830,328 | 8/1974 | Schaefer et al. . |
| 3,842,950 | 10/1974 | Fontaine . |
| 3,985,210 | 10/1976 | Hodge et al. . |
| 3,998,495 | 12/1976 | Maxwell et al. ........................... 303/89 |
| 5,036,961 | 8/1991 | Eberling et al. . |
| 5,399,002 | 3/1995 | Taylor ....................................... 303/89 |
| 5,675,190 | 10/1997 | Morita . |
| 5,747,886 | 5/1998 | Paw et al. ............................... 307/10.2 |

*Primary Examiner*—Chris Schwartz
*Attorney, Agent, or Firm*—Jeffery P. Calfa; Dennis K. Sullivan

[57] ABSTRACT

A parking brake lock-in key switch system for a truck or bus brake system is disclosed. The system has two parking brake lock-in valves. One parking brake lock-in valve is installed in the air line piping between the primary air tank and the push pull double check valve and the second parking brake lock-in valve is in the air line piping between the secondary air tank and the push pull double check valve. The parking brake lock-in valves are air operated valves which when closed will lock in actuated parking brakes. The parking brake lock-in valves are operated by a solenoid operated pilot valve which provides air from an air supply to close the lock-in valves when the ignition key is moved to the 'off' position. An actuated parking brake will be locked in because new air from the respective tanks will be prevented from flowing to the push pull double check valve and hence the brake chambers. The parking brake lock-in valve does not vent off downstream piping when it closes. Should the ignition key be positioned to the 'off' position with the vehicle in motion and the parking brake actuator is not engaged in the park position, air will be locked in the air line piping between the parking brake lock-in valves and the individual brake chambers including the piping in which the push pull double check valve is installed. This locked in air will prevent the brake chambers from locking the wheels, hence preventing inadvertent engagement of the parking brakes.

10 Claims, 3 Drawing Sheets

PARKING BRAKE LOCK-IN KEY SWITCH SYSTEM FOR VEHICLE AIR BRAKE SYSTEM

BACKGROUND OF THE INVENTION

The present invention relates to a parking brake lock-in key switch system for a truck or bus brake system. One type of vehicle on which an embodiment of this invention may be used is a school bus with an air brake system with a driver area operated parking brake actuator. The parking brake actuator is a push pull double check valve. Following a driver manually engaging the parking brake actuator, the parking brake lock-in key switch system will lock the parking brake in the engaged position upon the driver turning the ignition key to the 'off' position. This effectively disables the parking brake actuator preventing inadvertent release of the parking brake. This system will not cause an inadvertent initiation of the parking brake should a driver turn the ignition key to the 'off' position while the vehicle is moving down the road. The driver must first consciously operate the parking brake actuator for the parking brake lock-in key switch system of this invention to be functional.

PRIOR ART

Heretofore, parking brakes on vehicles with air brake systems have been operable by use of air from either a primary air tank or a secondary air tank. In prior art air brake systems used on International® truck and bus chassis, manufactured by Navistar International Transportation Corp., separate air lines run from the primary air tank and the secondary air tank to a parking brake actuator. The parking brake actuator is a push pull double check valve. The double check valve portion of the actuator will align the tank with the highest pressure to supply the brake chambers for individual wheel brakes. When pulled out or actuated to an 'Engaged' position, the push pull portion of the actuator closes off the air supply passageway from the air tanks and vents the single downstream air line. A single air line runs from the push pull double check valve through an inversion valve to spring brake chambers which act in a parking brake mode. The spring or park brake chambers are part of the individual brake assemblies for each wheel subject to park braking. Typically, the vehicle's rear wheels have the brake assemblies which act as parking brakes in addition to having a service brake function. The springs in the spring brake chambers act to lock the individual wheels when there is no air applied to counter the spring force. Operation of the push pull knob of the parking brake actuator with its resulting venting of the downstream air piping to the brake chambers allows the spring brakes to lock the individual wheels associated with the park braking. The spring brake chambers will only continue to lock the individual wheels so long as the parking brake actuator is in the 'Engaged' or pulled out position.

Vehicles with hydraulically operated service brakes have had air assisted drive line parking brakes in the prior art. While the hydraulic service brakes act directly on the wheels of the vehicle, the drive line parking brakes act to lock the drive line prop shaft of the vehicle. An air brake cylinder is engaged to the drum in the driveline which locks the shaft. The air brake cylinder allows the shaft to rotate when air is supplied to the cylinder. The air is provided from a single air reservoir through a parking spring brake control through a one way check valve to the air brake cylinder. When the driver operates the parking spring brake control to the engaged position, the air supply to the cylinder is stopped and the downstream piping is vented. Upon the venting of the piping between the spring brake control and the air brake cylinder, the air brake cylinder will cause the drum brake to lock the drive line prop shaft. Similar to the above described air brake system, the drum brake will only continue to lock the prop shaft so long as the parking spring brake control is in the 'Engaged' position.

Automatic parking brake systems exist in the prior art and will automatically vent downstream air lines supplying brake chambers or cylinders associated with park braking upon the operator turning the ignition key to an 'off' position. Hence the parking brakes will automatically engage. There is a real danger to vehicle, driver and passengers with these automatic parking braking engagement systems. A driver may inadvertently engage the parking brakes while the vehicle is operating at highway speeds by merely turning the ignition key to a non-operate or 'off' position. This involuntary automatic braking could result in a loss of control of the vehicle.

SUMMARY OF THE INVENTION

Accordingly, it is a primary object of the invention to provide a parking brake lock-in system for air brake systems and air assisted drive line parking brakes which will lock the parking brakes in an engaged position following manual engagement of the parking brakes and the driver subsequently turning the vehicle ignition key to the 'off' position. A second object of the invention is that the parking brake lock-in system must not cause an inadvertent engagement of the parking brake by the driver merely turning the ignition key to the 'off' position while the vehicle is moving.

The parking brake lock-in key switch system of this invention satisfies the primary object and has two parking brake lock-in valves. One parking brake lock-in valve is installed in the air line piping between the primary air tank and the push pull double check valve and the second parking brake lock-in valve is in the air line piping between the secondary air tank and the push pull double check valve. The parking brake lock-in valves are air operated valves which when closed will not allow system air pressure to the push pull double check valve. The parking brake lock-in valves are operated by a pneumatic pilot signal from an electric solenoid valve. With the ignition in the 'off' position, the solenoid valve will be closed and not send a pilot signal to the parking brake lock-in valves and therefore the lock-in valves will be closed. If the push pull double check valve, also known as the parking brake actuator is in the 'engaged' or pulled out position, the actuated parking brake will be locked in because new air from the respective tanks will be prevented from flowing to the push pull double check valve and hence the brake chambers. The springs in the brake chambers will maintain the wheels locked in position. When the ignition is moved to a 'run' or 'accessory' position, the solenoid valve opens to supply a pilot signal to open the parking brake lock-in valves.

The second objective that the system must not cause an automatic engagement of the parking brake by the driver merely turning the ignition key to the 'off' position is accomplished by having a parking brake lock-in valve design which does not vent off downstream air when it closes. Should the ignition be repositioned to the 'off' position with the vehicle in motion and the parking brake actuator not engaged in the park position, air will be locked in the air line piping between the parking brake lock-in valves and the individual brake chambers including the piping in which the push pull double check valve is installed.

This locked in air will prevent the brake chambers from locking the wheels, hence preventing inadvertent engagement of the parking brakes.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
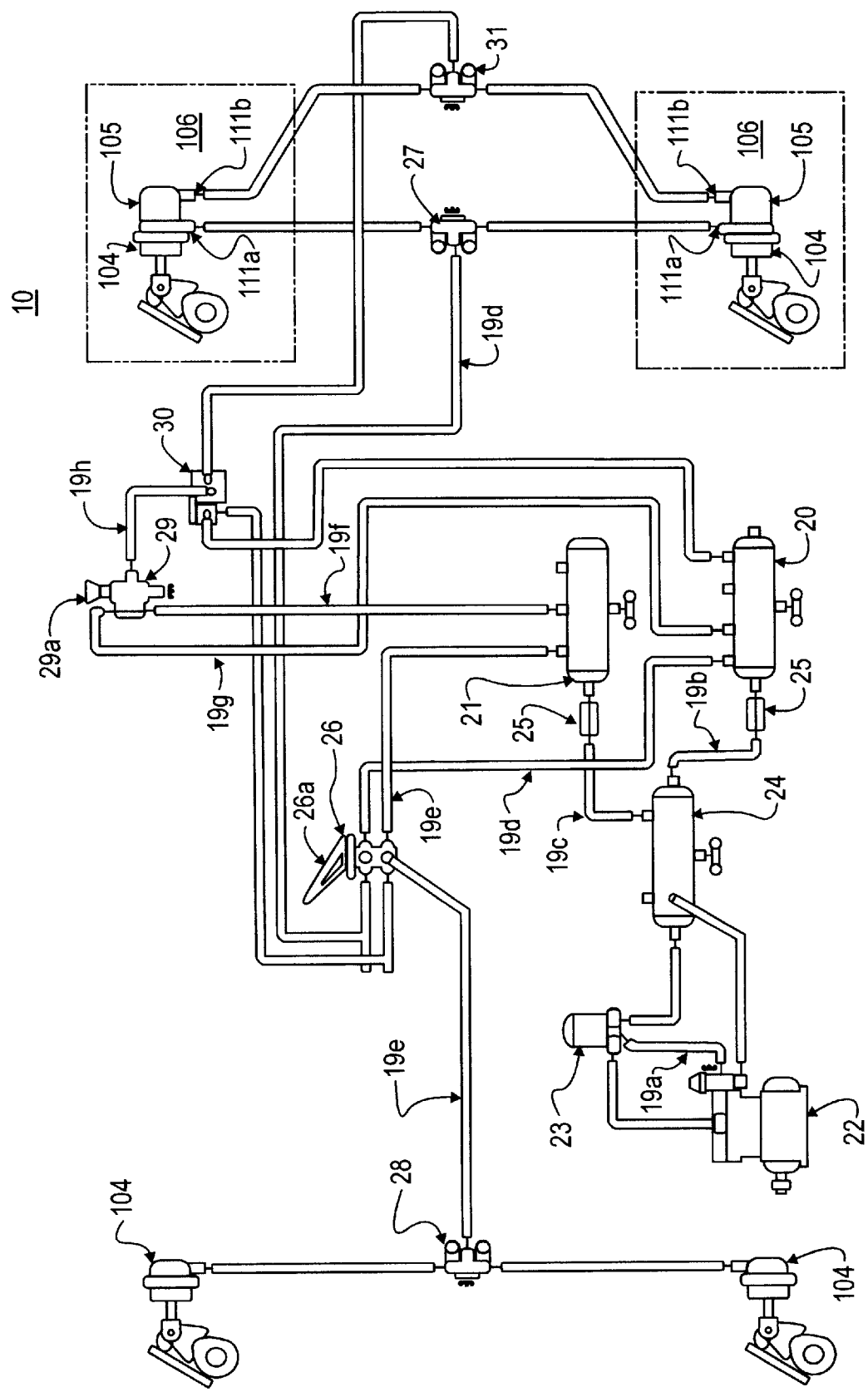
FIG. 1 is a schematic illustration of an air brake system of the prior art.

Referring now to the drawings in greater detail, in FIG. 1 there is shown a prior art air brake system 10 for a vehicle 101 (not shown) such as a school bus. The vehicle 101 has two front wheels 102 (not shown) and two rear wheels 103 (not shown). Each of the front wheels 102 and the rear wheels 103 has an associated individual wheel mounted service brake 104. The rear wheels 103 have a rear brake assembly 106 which includes a park or spring brake chamber 105 in addition to the service brake 104. The rear brake assemblies 106 provide both service braking while the vehicle 101 is driven and park braking to hold the stopped vehicle 101 in a fixed location. The dual function of the rear brake assemblies 106 is accomplished by having two separate air ports 111a and 111b on the service brake chambers 104 and the spring brake chambers 105, respectively. The service braking air port 111a allows air to be directed to the service brake chamber 104 to move brake pads 112 (not shown) to stop the rear wheels 103. The park braking port 111b allows air to be directed to the spring brake chambers 105 to act counter to the springs 107 (not shown) to move the brake pads 112 to allow the free movement of the rear wheels 103.

The vehicle 101 has an engine 108 (not shown) which is started by use of an ignition 109. A driver of the vehicle will insert a key 110 (not shown on FIG. 1) into the ignition 109 (not shown on FIG. 1) and turn the key to a 'run' position to start the engine 108. The driver will turn the key 110 to an 'off' position to stop the engine 108 following driving the vehicle 101 to a location to park. The ignition 109 also has an 'accessory' position to allow operation of vehicle utility equipment 119 (not shown) such as a radio.

Components in the air brake system 10 are operatively engaged to each other via air lines 19 as described below. The air brake system 10 has a primary air tank 20 and a secondary air tank 21. An air compressor 22 supplies air to a wet tank 24 via air lines 19a through an air dryer 23. The wet tank 24 acts as a supply reservoir for both the primary air tank 20 and the secondary air tank 21 via air lines 19b and 19c respectively. Each of air lines 19b and 19c between the wet tank 24 and the primary air tank 20 and the secondary air tank 21, respectively, has a check valve 25 which allows air to flow only from the wet tank 24 to the other tanks and not in the reverse direction.

The primary air tank 20 is engaged to the service brake chambers 104 for service braking for the rear wheels 103 via the air lines 19d through a driver operated brake foot pedal valve 26 and a first quick release valve 27. The secondary air tank 21 is engaged to the service brake chambers 104 for the front wheels 102 for service braking via air lines 19e through the brake foot pedal valve 26 and a second quick release valve 28. When a driver depresses a brake foot pedal 26a, the brake foot pedal valve 26 opens and air is supplied to the service brake chambers 104, for rear and front service braking respectively. The service brake engagement function occurs by the presence of air being supplied to the brake chambers 104 in contrast to the park brake function which occurs due to the venting off or removal of air from park braking port 111b of the spring or park brake chamber 105.

The primary air tank 20 and the secondary air tank 21 are engaged to the spring brake chambers 105 for park braking via air lines 19f, 19g, and 19h respectively. Air lines 19f and 19g run separately from the respective tanks to a push pull double check valve 29 from which a single air line 19h runs to the spring or park brake chambers 105 through an inversion valve 30 and a quick release valve 31. Two lines are provided by the use of air lines 19f and 19g to ensure that no single line brake failure in the supply from either the primary air tank 20 or the secondary air tank 21 will cause the parking brakes to engage when not desired such as when vehicle 101 is on the highway at highway speeds. When parking, a driver of a vehicle 101 operates a parking brake actuator or knob 29a to an engaged or pulled out position which operates the push pull double check valve 29. The push pull double check valve 29 then shuts off the air supply from air lines 19f and 19g from the primary air tank 20 and the secondary air tank 21 and vents off air line 19h to the external atmosphere. Once air is vented from air line 19h, springs 107 (not shown) in the spring brake chambers 105 act to lock the two rear wheels 103 due to the springs acting on brake pads 112 (not shown). If the parking brake actuator or knob 29a is moved out of the engaged position (i.e. pushed in), air will be supplied through the push pull double check valve 29 to the spring brake chambers 105 through air line 19h to release the rear wheels 103. The vehicle 101 would be free to roll.

Figure 2:
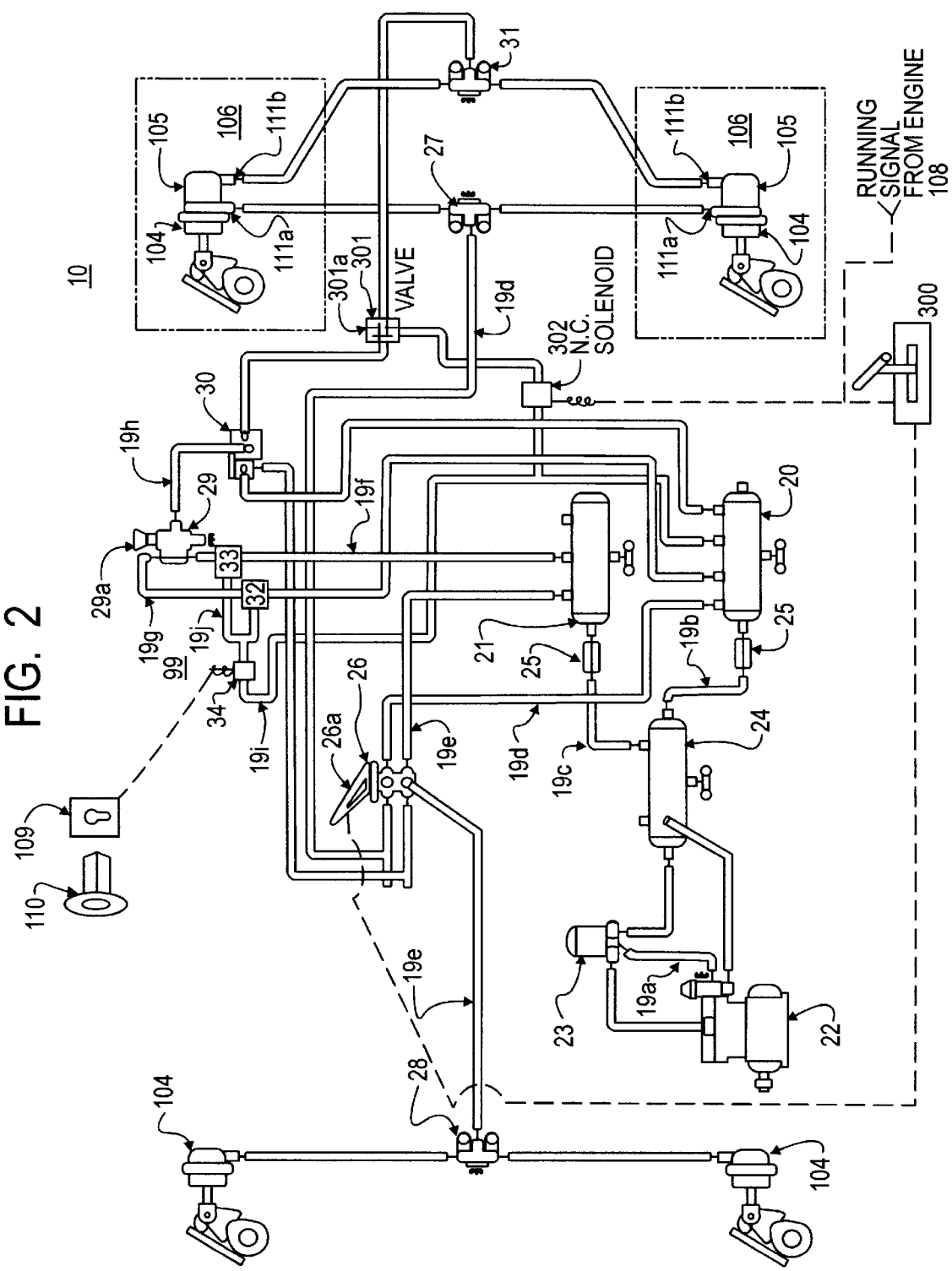
FIG. 2 is a schematic illustration of an air brake system made pursuant to the teachings of the present invention.

FIG. 2 shows an air brake system 10 which includes a park brake lock-in key switch system 99 made pursuant to the teachings of the present invention. The number designations and components in FIG. 2 are the same as those in FIG. 1 with the exception of the additional components intrinsic to the present invention as described below. The park brake lock-in key switch system 99 has a primary parking brake lock-in valve 32 and a secondary parking brake lock-in valve 33. The primary parking brake lock-in valve 32 is engaged in the air line 19g between the primary air tank 20 and the push pull double check valve 29. Closure of the primary parking brake lock-in valve 32 will stop air from flowing from the primary air tank 20 to the push pull double check valve 29. The secondary parking brake lock-in valve 33 is engaged in the air line 19f between the secondary air tank 21 and the push pull double check valve 29. Closure of the secondary parking brake lock-in valve 33 will stop air from flowing from the secondary air tank 21 to the push pull double check valve 29. Closure of both the primary parking brake lock-in valve 32 and the secondary parking brake lock-in valve 33 will therefore stop air from flowing to the parking brake ports 111b of the spring brake chambers 105. The primary parking brake lock-in valve 32 and a secondary parking brake lock-in valve 33 are of a design such that downstream air line piping to the spring brake chambers 105 through the push pull double check valve 29 will not be vented when the parking brake lock-in valves 32 and 33 are closed. Air trapped in air lines 19h, 19g, and 19f between the parking brake lock-in valves 32 and 33 and the respective spring brake chambers 105 will maintain a counter force against the springs 107 of the spring brake chambers 105. Hence, the rear wheels 103 will remain free to rotate.

The primary parking brake lock-in valve 32 and a secondary parking brake lock-in valve 33 are operatively engaged to the ignition 109 so that the parking brake lock-in valves 32 and 33 will automatically close upon a driver of the vehicle turning the key 110 of the ignition 109 to the 'off' position. So long as the parking brake actuator 29*a* is pushed in or in other words not in the engaged position, moving the key 110 to the 'off' position will not cause the springs 107 to stop the rear wheels 103 from rotating. This is due to the 'locked-in' air in air line 19*h*, 19*f* and 19*g*.

If the driver moves the parking brake actuator 29*a* to a park brake engaged or pulled out position, the push pull double check valve 29 would close off air to and vent air line 19*h* to allow the springs 107 to move the brake pads 112 to prevent the rear wheels 103 from rotating. Subsequent turning of the key 110 to an 'off' position would lock in the park brake by preventing new air to flow from the primary air tank 20 or secondary air tank 21 to the push pull double check valve 29. If the parking brake actuator 29*a* is subsequently moved to out of the parking brake engaged position (i.e. pushed in), the only air in air line 19*h* between the primary parking brake lock-in valve 32 and a secondary parking brake lock-in valve 33 and the spring brake chambers 105 would be the small volume was trapped in air lines 19*g* and 19*f* between the parking brake lock-in valves 32 and 33 and the push pull double check valve 29. This small volume of air would be insufficient to act counter to the force of the springs 107 to allow the rear wheels 103 to rotate. This small volume would even be insufficient to act counter to the internal springs 121 (not shown) of the push pull double check valve 29 to open the push pull double check valve. In this manner, the turning of the key 110 of the ignition 109 to the 'off' position effectively disables the parking brake actuator 29*a* and maintains the rear wheels 103 in a locked or brake applied condition.

In the preferred embodiment, the primary parking brake lock-in valve 32 and a secondary parking brake lock-in valve 33 are air operated valves. Actuating air 114 (not shown) for these air operated valves is supplied through a solenoid operated pilot valve 34. The solenoid operated pilot valve 34 is engaged to an air supply source such as the primary air tank 20 through air line 19*i*. The solenoid operated pilot valve 34 is engaged to supply air to the primary parking brake lock-in valve 32 and a secondary parking brake lock-in valve 33 through air line 19*j*. The solenoid operated air valve 34 is electrically engaged to the ignition 109 so that the solenoid operated air valve 34 opens to supply actuating air 114 upon movement of the key 110 to the 'accessory' or 'run' positions. Actuating air 114 pressure causes the primary parking brake lock-in valve 32 and a secondary parking brake lock-in valve 33 to open and allow air from the primary air tank 20 and the secondary air tank 21 to the push pull double check valve 29.

One air operated valve appropriate for use as the primary parking brake lock-in valve 32 and a secondary parking brake lock-in valve 33 is a Humphrey Products three (3) way pilot valve shown on Humphrey Products drawing 250A-3-10-20. The vent port of the Humphrey Products valve is plugged so that the valve is effectively a two way valve which will not vent downstream piping when closed.

Figure 3:
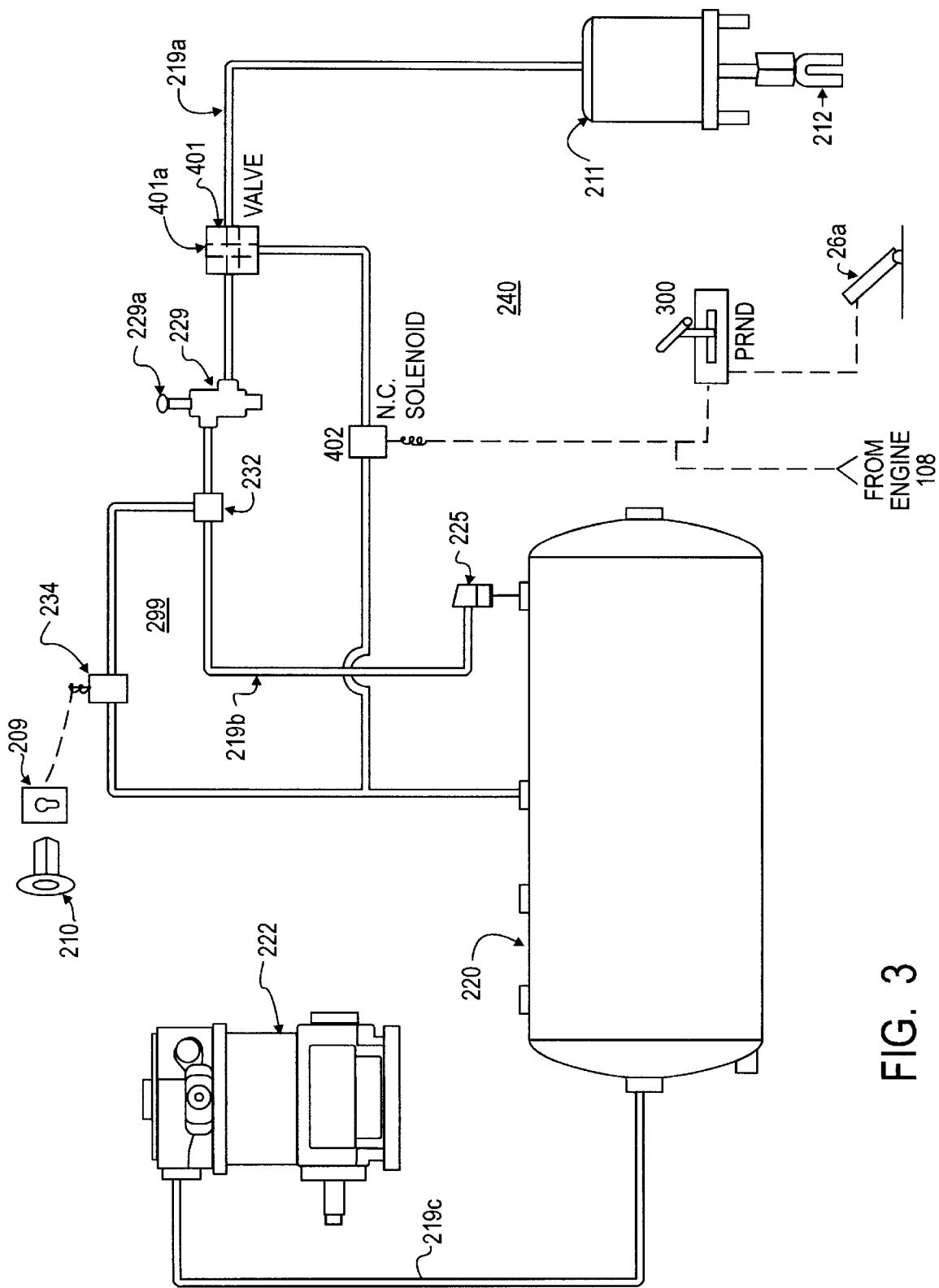
FIG. 3 is a schematic illustration of an air assisted drive line parking brake system made pursuant to the teachings of the present invention.

FIG. 3 is a schematic illustration of an air assisted drive line parking brake system 240 with a park brake lock-in key switch system 299 made in accordance with the teachings of the present invention. The air assisted drive line parking brake system 240 is installed on a vehicle 201 (not shown) with an engine 208 (not shown). The engine is engaged to rotate rear wheels 203 (not shown) through a drive line prop shaft 204 (not shown) and a gear box 205 (not shown). The engine 208 is started by a driver turning a key 210 in an ignition 209 to a 'run' position and the engine 208 is stopped by the driver turning the key 210 to an 'off' position. The ignition 209 also has an 'accessory' position. The air assisted drive line parking brake system 240 has an air brake cylinder 211 and a drum brake 212 (not shown). The drum brake 212 when actuated will stop the prop shaft 204 and hence the rear wheels 203 from rotating. The air brake cylinder 211 is air operated and controls the drum brake 212. When air is supplied to the air brake cylinder 211, the drum brake 212 is disengaged from the prop shaft 204 allowing the prop shaft 204 rotate. When air is vented from the air brake cylinder 211, the drum brake 212 engages the prop shaft 204 to stop the prop shaft 204 from rotating. Air is normally supplied to the air brake cylinder 211 from an air reservoir 220 through a spring brake control 229. The spring brake control 229 has an operating knob 229*a*. An air line 219*a* is used to engage the air brake cylinder 211 with the spring brake control 229. An air line 219*b* is used to engage the spring brake control 229 to the air reservoir 220. A check valve 225 is in the air line 219*b* between the air reservoir and the spring brake control 229 to ensure no back flow of air. The air reservoir 220 is re-supplied air through an air line 219*c* from an air compressor 222. When a driver of the vehicle 201 positions or pulls out the knob 229*a* of the spring brake control 229 to a brake engaged position, air is shut off from the air reservoir 220 and air is vented from the air brake cylinder 211 and air line 219*a*. This air venting from the air brake cylinder 211 causes the drum brake 212 to stop and lock the prop shaft 204 from rotating. The air assisted drive line parking brake system 240 of this invention has an in line parking brake lock-in valve 232 engaged in the air line 219*b* so as to stop air from flowing to the spring brake control 229 and hence the air brake cylinder 211 when the parking brake lock-in valve 232 closes. When closed, the parking brake lock-in valve 232 will not vent downstream piping and hence trap any air already in the downstream air line 219*a* and the portion of 219*b* between the parking brake lock-in valve 232 and the spring brake control 229. This ability to trap downstream air in a portion of air lines 219*b* and 219*a* prevents an inadvertent application of the parking brakes upon a driver merely turning the key 210 of the ignition 209 to an 'off' position with the vehicle 201 at highway speeds. The ability of the parking brake locking valve 232 to shut off air from the air reservoir 220 will lock in the parking brakes and keep the prop shaft 204 from rotating once the key 210 of the ignition 209 is moved to the 'off' position following the positioning of the spring brake control 229 to the brake engaged position.

As described above, the park brake lock-in key switch systems 99 and 299 of the present invention provide a number of advantages, some of which have been described above and others of which are inherent in the invention. Also modifications may be proposed to the park brake lock-in key switch systems 99 and 299 without departing from the teachings herein. Accordingly, the scope of the invention is only to be limited as necessitated by the accompanying claims.

We claim:

1. A parking brake lock-in key switch system for an air brake system for a mobile vehicle with an engine, and a key and an ignition with a run position for starting the engine, an off position for stopping the engine and an accessory position, and two front wheels and two rear wheels, comprising:
- (a) a rear brake assembly engaged to each of the rear wheels;
- (b) each said rear brake assembly having a spring brake chamber;
- (c) said spring brake chambers having a spring which expands to apply brake pads to stop rotation of the rear wheels;
- (d) said spring being compressible under counter acting air pressure to move and release said brake pads to allow rotation of the rear wheels;
- (e) a primary air tank for supplying air to said spring brake chambers;
- (f) a secondary air tank for supplying air to said spring brake chambers;
- (g) air lines running from said primary air tank to a push pull double check valve, from said secondary air tank to said push pull double check valve, and from said push pull double check valve to said spring brake chambers;
- (h) said push pull double check valve having a driver operated parking brake actuator for stopping air flow through and venting said air lines from said push pull double check valve to said spring brake chambers;
- (i) a primary parking brake lock-in valve operatively engaged in said air lines running from said primary air tank to said push pull double check valve;
- (j) a secondary parking brake lock-in valve operatively engaged in said air lines running from said secondary air tank to said push pull double check valve; and
- (k) said primary parking brake lock-in valve and said secondary parking brake lock-in valve are operatively engaged to close and not vent downstream air lines when the key of the ignition is turned to the off position and to open when the key is turned to the run or accessory positions.

2. The parking brake lock-in key switch system of claim 1, wherein:
- (a) said primary parking brake lock-in valve and said secondary parking brake lock-in valve are air operated valves.

3. The parking brake lock-in key switch system of claim 2, wherein:
- (a) said primary parking brake lock-in valve and said secondary parking brake lock-in valve are supplied actuating air from a solenoid operated pilot valve;
- (b) said solenoid operated pilot valve is engaged to an air supply source;
- (c) said solenoid operated pilot valve is electrically engaged to the ignition to close off air from said air supply source to close said primary parking brake lock-in valve and said secondary parking brake lock-in valve when the key of the ignition is turned to the off position; and
- (d) said solenoid operated pilot valve will open when the key of the ignition is turned to the run or accessory positions to allow air flow from said air supply source to open said primary parking brake lock-in valve and said secondary parking brake lock-in valve.

4. The parking brake lock-in key switch system of claim 3, wherein:
- (a) said primary parking brake lock-in valve and said secondary parking brake lock-in valve are three way pilot valves with vent ports plugged.

5. A parking brake lock-in key switch system for an air assisted drive line park brake system for a mobile vehicle with an engine, a key and an ignition with a run position for starting the engine, an off position for stopping the engine and an accessory position, two front wheels and two rear wheels and a drive line prop shaft and gear box operatively engaged to the engine and the rear wheels to rotate the rear wheels, comprising:
- (a) a drum brake engageable to stop the prop shaft from rotating;
- (b) an air brake cylinder for operating said drum brake;
- (c) said air brake cylinder operatively engaged to cause said drum brake to release the prop shaft to rotate when air is supplied to said air brake cylinder;
- (d) said air brake cylinder operatively engaged to cause said drum brake to stop the prop shaft from rotating when air is vented from said air brake cylinder;
- (e) a spring brake control for stopping air flow and venting downstream air lines;
- (f) an air reservoir:
- (g) air lines running from said air reservoir to said spring brake control and from said spring brake control to said air brake cylinder;
- (h) a parking brake lock-in valve operatively engaged in said air lines from said air reservoir to said spring brake control; and
- (i) said parking brake lock-in valve being operatively engaged to close and not vent downstream air lines when the key of the ignition is positioned to the off position and said parking brake lock-in valve to open when the key is positioned to the run or accessory positions.

6. The parking brake lock-in key switch system of claim 5, wherein:
- (a) said parking brake lock-in valve is an air operated valve.

7. The parking brake lock-in key switch system of claim 6, wherein:
- (a) said parking brake lock-in valve is supplied actuating air from a solenoid operated pilot valve;
- (b) said solenoid operated pilot valve is engaged to said air reservoir;
- (c) said solenoid operated pilot valve is electrically engaged to the ignition to close off air from said air reservoir to close said parking brake lock-in valve when the key of the ignition is turned to the off position, and (d) said solenoid operated pilot valve will open when the key of the ignition is turned to the run or accessory positions to allow air flow from said air reservoir.

8. The parking brake lock-in key switch system of claim 7, wherein:
- (a) said parking brake lock-in valve is a three a way pilot valve with a vent port plugged.

9. The parking brake lock-in key switch system of claim 3, wherein:
- (a) said air supply source is said primary air tank.

10. The parking brake lock-in key switch system of claim 3, wherein:
- (a) said air supply source is said secondary air tank.

* * * * *